Aug. 13, 1929.　　　　S. DEBUS　　　　1,724,643
PAN GREASING MACHINE
Filed Oct. 7, 1927　　　5 Sheets-Sheet 1

Inventor
Sander Debus.
By Lacey & Lacey, Attorneys

Aug. 13, 1929.  S. DEBUS  1,724,643
PAN GREASING MACHINE
Filed Oct. 7, 1927   5 Sheets-Sheet 3

Inventor
Sander Debus.
By Lacey & Lacey, Attorneys

Aug. 13, 1929.   S. DEBUS   1,724,643
PAN GREASING MACHINE
Filed Oct. 7, 1927   5 Sheets-Sheet 4

Inventor
Sander Debus.
By Lacey & Lacey, Attorneys

Aug. 13, 1929.  S. DEBUS  1,724,643
PAN GREASING MACHINE
Filed Oct. 7, 1927   5 Sheets-Sheet 5

Inventor
Sander Debus.
By Lacey & Lacey, Attorneys

Patented Aug. 13, 1929.

1,724,643

UNITED STATES PATENT OFFICE.

SANDER DEBUS, OF HASTINGS, NEBRASKA.

PAN-GREASING MACHINE.

Application filed October 7, 1927. Serial No. 224,705.

This invention has for its object the provision of mechanism whereby baking pans may be effectually sprayed with hot grease and the supply of the spray automatically controlled through the movement of the pans over the spraying nozzles. Another object of the invention is to provide means whereby the fumes of the grease may be driven from the machine and any grease which may tend to pass off with the fumes will be trapped and may be subsequently recovered for further use. The invention also provides means whereby the surplus grease which drops from the pans and the spraying elements may be returned to the grease supply and screened or filtered so that any impurities which may have been caught by it will be removed. The invention also provides means whereby the spraying elements may be adjusted to the size of the pans being treated and seeks generally to improve the construction, arrangement and operation of the several parts to the end that the durability and efficiency of the machine may be increased. These stated objects, and other objects which will incidentally appear in the course of the following description, are attained in the use of such an apparatus as is illustrated in the accompanying drawings, and the invention resides in certain novel features which will be particularly pointed out in the appended claims.

In carrying out the invention, there is provided a casing, indicated generally at 1, which is of proper form and dimensions to house all the working parts and which may conveniently be constructed of sheet metal reinforced at the corners and at all points of strain by angle bars or similar elements. In the lower portion of the casing, there is arranged a reservoir 2 for compressed air and at one end of the casing is provided a motor 3 driving an air compressor 4 and also operating a grease pump 5, these parts being of any approved or well known construction and being illustrated in a conventional manner only. The casing is also provided with a screened opening 6 in its end to admit air to the compressor and avoid the passage of dust and other foreign matter into the compressor and the tank with the air. Above the compressor 4 is a fan or blower 7 having its own motor 8 and there will also be provided in the front of the casing suitable switches for controlling the motors 3 and 8 as well as the circuit for the electric heating element in the grease pot and pressure gages connected with the air and grease circulating systems, as well as a thermometer and other instrumentalities which may be advantageous in the operation of the apparatus. At the opposite end of the casing, there is a transverse partition 9 whereby a compartment 10 is provided for the storage of pan-supporting dies or plates which are not in use, it being the intention to provide a plurality of pan-carrying plates or dies of various dimensions so that pans of any standard sizes may be treated in the machine.

Figure 1:
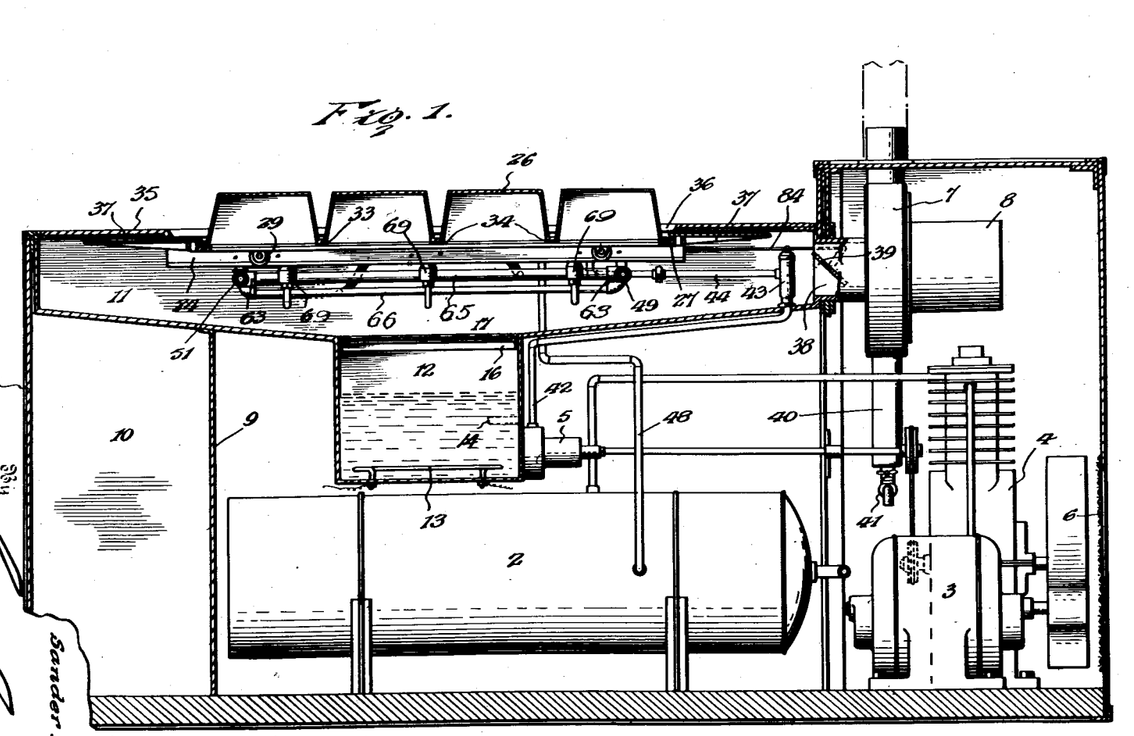
Figure 1 is a view, partly in elevation and partly in longitudinal section, of an apparatus embodying the invention.
Figure 3:
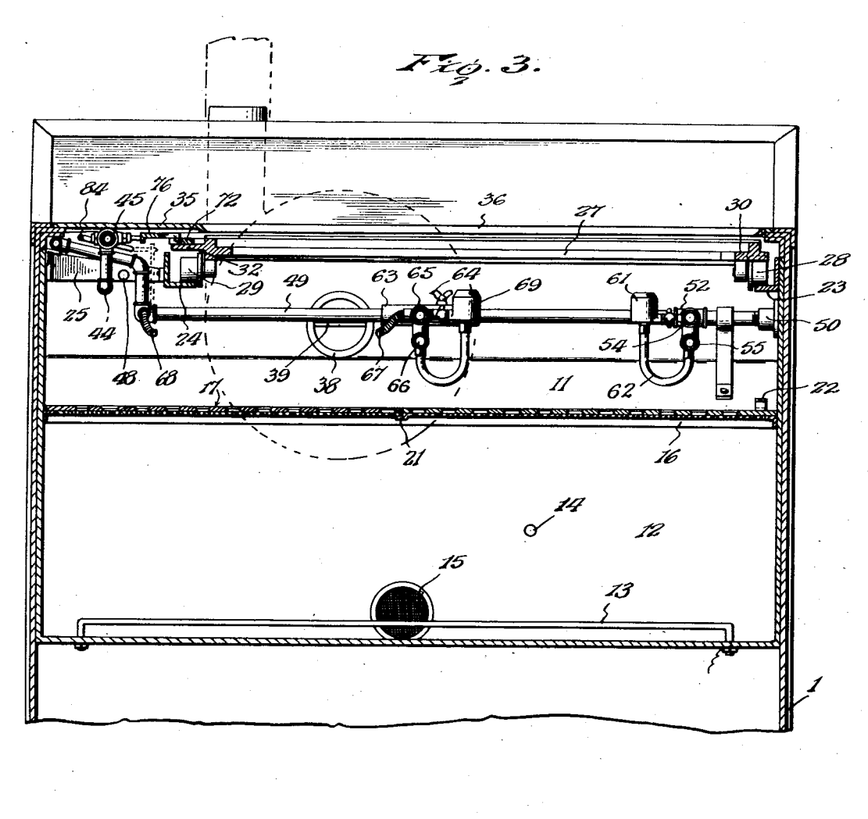
Fig. 3 is a transverse section on the line 3—3 of Fig. 2.
Figure 4:
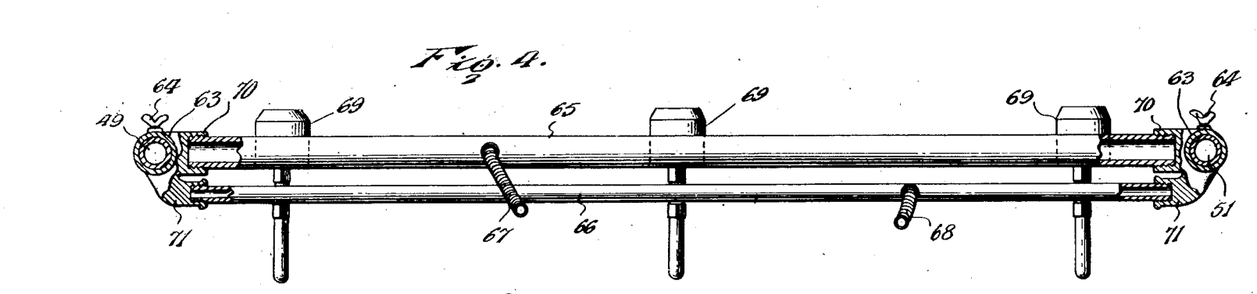
Fig. 4 is an enlarged elevation of the adjustable spraying device with parts in section on the line 4—4 of Fig. 2.
Figures 7, 8, 9:
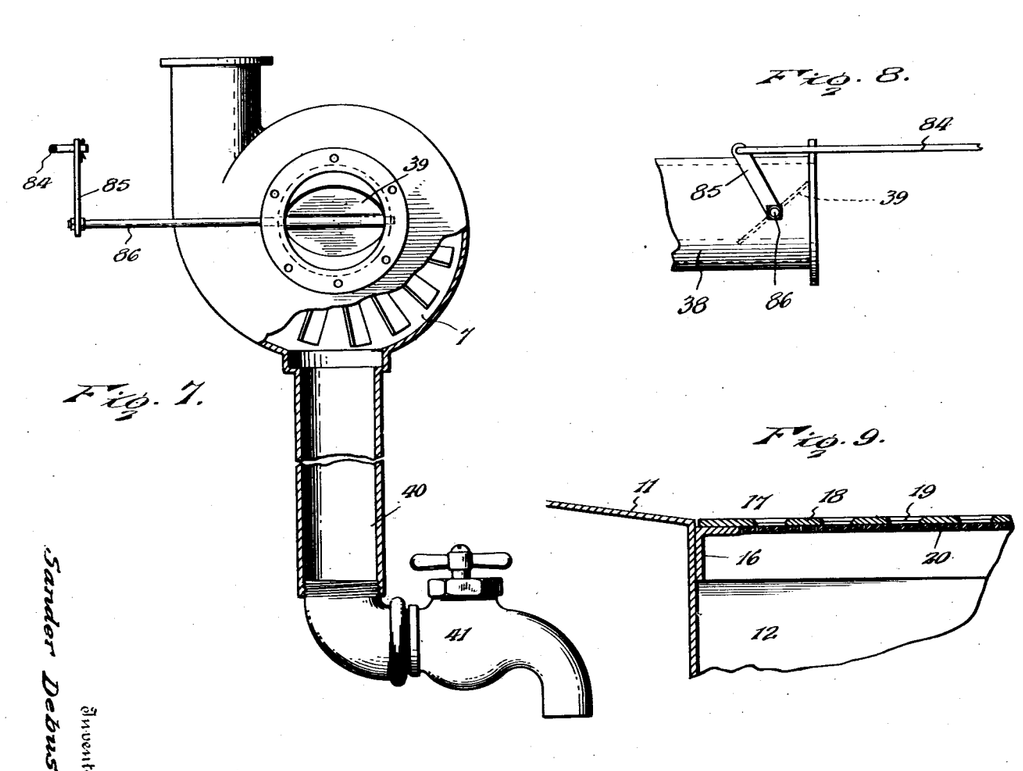
Fig. 7 is a sectional elevation of the damper and blower whereby the obnoxious fumes are driven off.
Fig. 8 is a detail elevation of the damper.
Fig. 9 is an enlarged detail section of a portion of the grease pot and the strainer cover for the same.

In the upper portion of the casing, there is supported a tank 11 having its bottom inclined from its ends toward its transverse central line to direct surplus grease back into the grease pot 12 which may conveniently be formed as an integral portion of the tank, the grease pot depending from the bottom of the tank, as shown clearly in Fig. 1, and having an electric heating element 13 carried upon its bottom, as shown. The heating element 13 will, of course, be insulated from the bottom of the grease pot and will be connected with a source of current by conductors leading from the ends of the element, as indicated in Fig. 1, and a thermometer, indicated at 14, may be provided in the grease pot if desired. The grease pump 5 is mounted upon the side of the grease pot adjacent the bottom of the same and the outlet from the pot to the pump is suitably screened, as shown at 15 in Fig. 3. On the walls of the grease pot, immediately adjacent the top thereof, ledges 16 are secured thereto and a cover 17 is supported on the ledges. As shown most clearly in Fig. 9, this cover consists of an upper plate 18 having countersunk openings 19 therethrough and a screen plate 20 welded to the under side of the cover and having its edges spaced from the edges of the upper plate whereby the cover may rest upon and conform to the ledges 16, as shown. Preferably, the cover is formed in two sections, as shown in Fig. 3, the front section being provided at its rear end with a strip 21 projecting rearwardly so as to underlie the front edge of the back section and the front section is equipped at its front end with a convenient handle 22 whereby it may be easily inserted in place or removed as necessary.

Secured upon the front wall of the tank adjacent the top thereof is a track 23 which may conveniently be an angle bar, and a similar track 24 is carried by brackets 25 secured to the back wall of the tank, the track 24 being thus spaced from the back wall of the tank, to provide space for some of the operating mechanism and the pipes whereby the grease and air are led from the pump 5 and the reservoir 2 to the spraying devices. The pans, shown at 26 in Fig. 1, are moved back and forth over the spraying nozzles by a carriage 27, which carriage is equipped with rollers 28 running upon the front track 23 and rollers 29 running upon the back track 24. The carriage is an open metallic frame rabbeted, as shown at 30, to support a die plate and its front side is formed with inwardly projecting enlargements 31 to which the bearings for the front rollers 28 are secured, the under surface of the front side of the carriage being slightly recessed so that the rollers 28 may be located under the carriage, as shown in Fig. 3, thereby bringing the carriage close to the front of the tank. The rear side of the carriage is formed with rearwardly projecting extensions or plates 32, the purpose of which will presently appear. The die plate, indicated at 33, is of proper dimensions to fit upon the rabbet 30 of the carriage so as to be held against relative movement and it is constructed with partitions 34 upon which and the sides of the plate the baking pans may rest in inverted position, the spaces between the several partitions and the sides of the die plate being entirely open and unobstructed so that a free passage for the spray is provided. A cover 35 is provided on the casing over the tank and the operating mechanism and has an opening 36 therethrough so that the pans will be accommodated and ample movement of the pans to permit thorough greasing will be allowed. Extension plates 37 are secured to the sides of the carriage and project therefrom under the side portions of the cover 35 so that the spraying grease cannot escape through the opening 36 but will be deflected by the extension plates 37 and turned back into the tank to run down the inclined bottom of the same to the screen cover 17 and thence pass back to the grease pot. At one end of the tank is an outlet 38 in which is pivotally mounted a damper 39, the outlet 38 leading directly into the blower or fan 7 so that when the damper is in open position fumes of the grease will be drawn from the tank and driven outside the building. During the working stroke of the carriage, the damper is closed and on the back stroke of the carriage the damper is automatically opened and it remains open at all times, except when the carriage is making its working stroke. Depending from the casing of the fan or blower 7 is a trap 40 having a drain cock 41 at its lower end whereby any grease with which the fumes may be loaded will be caught to be subsequently recovered.

Figure 5:
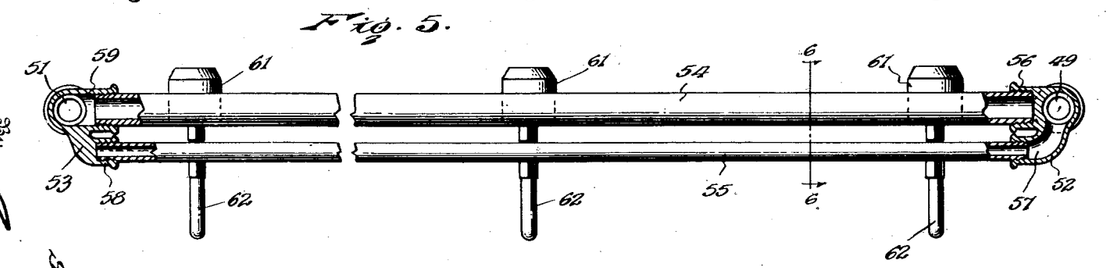
Fig. 5 is an elevation of the stationary spraying device, with parts in section, on the line 5—5 of Fig. 2.
Figure 6:
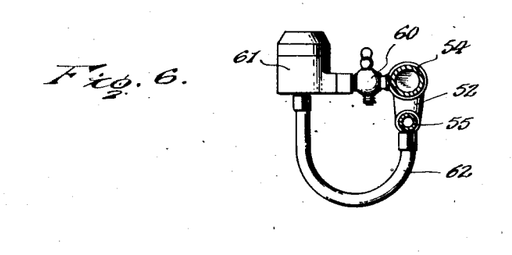
Fig. 6 is a detail section on the line 6—6 of Fig. 5.

An outlet pipe 42 leads from the grease pump 5 under the tank toward one end of the same where it is connected with a pressure governor 43 of any approved construction which will prevent excessive pressure of the grease in the spraying nozzles or at the grease cut-off valve. From the pressure regulator 43, a pipe 44 leads to the grease cut-off valve 45 which is located under the cover 35 between the back track 24 and the back of the tank. This cut-off valve may be of any preferred or approved form in which the valve is opened by inward movement of its stem, indicated at 46, and the air cut-off valve 47 is of like construction, the air cut-off valve being also located between the back track 24 and the back wall of the tank. A pipe 48 connects the air valve with the reservoir 2. From the oil cut-off valve 45, a pipe 49 extends into the tank along one side of the same and has its front end supported in a box 50 secured on the front wall of the tank and serving as a closure for said end of the pipe. At the opposite side of the tank, a pipe 51 is mounted and this pipe leads from the air cut-off valve 47 and has its front end supported in a socket or box which is similar to the box 50 and serves as a closure for the end of the pipe 51. Adjacent the front ends of the pipes 49 and 51, fittings 52 and 53 are mounted, respectively, thereon, and these fittings carry a cross air pipe 54 and a cross grease pipe 55, as best shown in Fig. 5. The fitting 52 is in the form of a coupling sleeve having its bore in communication with the bore of the pipe 49 and constructed with a nipple 56 on its side in which the end of the air pipe 54 is threaded, the base of the nipple constituting a closure for said pipe. Extending downwardly from the sleeve is an elbow in which the end of the grease pipe 55 is fitted and this elbow has a passage 57 conducting the grease from the pipe 49 into the pipe 55, as clearly shown in Fig. 5. The fitting 53 has a depending elbow which is solid and has a socketed end 58 receiving the end of the pipe 55 whereby said end will be supported but will be closed to prevent the escape of the grease, and the upper portion of the fitting 53 is in the form of a sleeve having a lateral nozzle 59 receiving the end of the pipe 54 whereby said pipe is placed in communication with the air supply pipe 51. Fitted into the air pipe 54 at intervals are valve casings 60 which establish communication between said pipe and spray nozzles 61 and at corresponding intervals connecting tubes 62 are fitted to the oil pipe 55 and lead into the spray nozzles so that when the valves 60 are opened and the apparatus is operating the compressed air will escape through the nozzle and create a suction which will draw a supply of grease through the nozzle, the air and grease commingling whereby the grease will be atomized and discharged in a fine spray against the inner surface of the inverted pans 26. It will be understood that the valves 60 are set so as to adjust the flow through the individual nozzles as it frequently happens that, notwithstanding care in manufacture and in assembling, the nozzles do not operate in precisely the same manner. The air supply, however, is derived from the reservoir 2 and is maintained in said reservoir by the action of the air compressor 4 while the grease pump 5 operates to maintain a sufficient supply of grease in the several grease pipes so that there will at no time be a failure of the supply of either the grease or the air.

Slidably mounted upon the pipes 49 and 51 are sleeves 63 which are held in set positions by thumb screws 64 mounted therein and bearing upon the respective pipes 49 and 51 in an obvious manner. An air pipe 65 and a grease pipe 66 are carried by the sleeves 63, and a flexible hose 67 connects the pipe 65 with the air pipe 51 while a similar flexible hose 68 connects the oil pipe 66 with the oil supply pipe 49. Nozzles 69 are connected with the pipes 65 and 66 in the same manner that the nozzles 61 are connected with the pipes 54 and 55 so that both ends of the baking pans will be sprayed.

Each sleeve 63 is constructed with upper and lower lateral arms 70 and 71 having sockets in their ends receiving the ends of the pipes 65 and 66, respectively, and forming closures for said pipes. It will thus be seen that the nozzles 69 may be set at any desired distance from the stationary nozzles 61 and the apparatus thereby adjusted to the length of the pans which are being greased.

Pivotally mounted upon each bracket or extension plate 32 is a cam lever 72 which has its free end turned obliquely toward the carriage, as shown at 73, and tending constantly to bear against the carriage. These cam levers may be yieldably held toward the carriage in any convenient manner, and I have indicated at 74 torsion springs coiled around the pivots of the respective levers and having their ends fitted in the levers and the plates 32 respectively, it being noted that the greater portion of the length of each lever is spaced from the carriage and maintained in that spaced relation by the obliquely turned end 73. Mounted upon respectively adjacent brackets 25 are valve-controlling lever arms 75 and 76 each of which has an inturned terminal 77 carrying a roller 78 which is adapted to ride upon the adjacent cam 72 and upon the side of the carriage in the operation of the mechanism. The outer sides of the levers 75 and 76 are connected in any convenient manner with the stems of the valves 47 and 45 respectively so that as these levers rock the valves will be opened or closed. The lever 76 is equipped with a finger or extension 79 at its pivot end and a spring 80 is secured to and extends between this finger and the back wall of the tank so as to hold the free end of the lever normally inward. The end of the lever 75 is formed with an outwardly extending projection 81 having a pin and slot connection with one arm of an angle lever 82 and a spring 83 is attached to said angle lever and to the back wall of the tank to exert a constant tension thereon holding the lever 75 inward. To the outer end of the angle lever is pivoted one end of a connecting rod 84 which extends to the motor end of the casing and is there pivoted to the free end of a crank 85 on the end of the rod or shaft 86 which carries the damper 39, the damper being thus opened and closed by the action of the angle lever 82 which, in turn, depends for its operation upon the reciprocation of the carriage.

Figure 2:
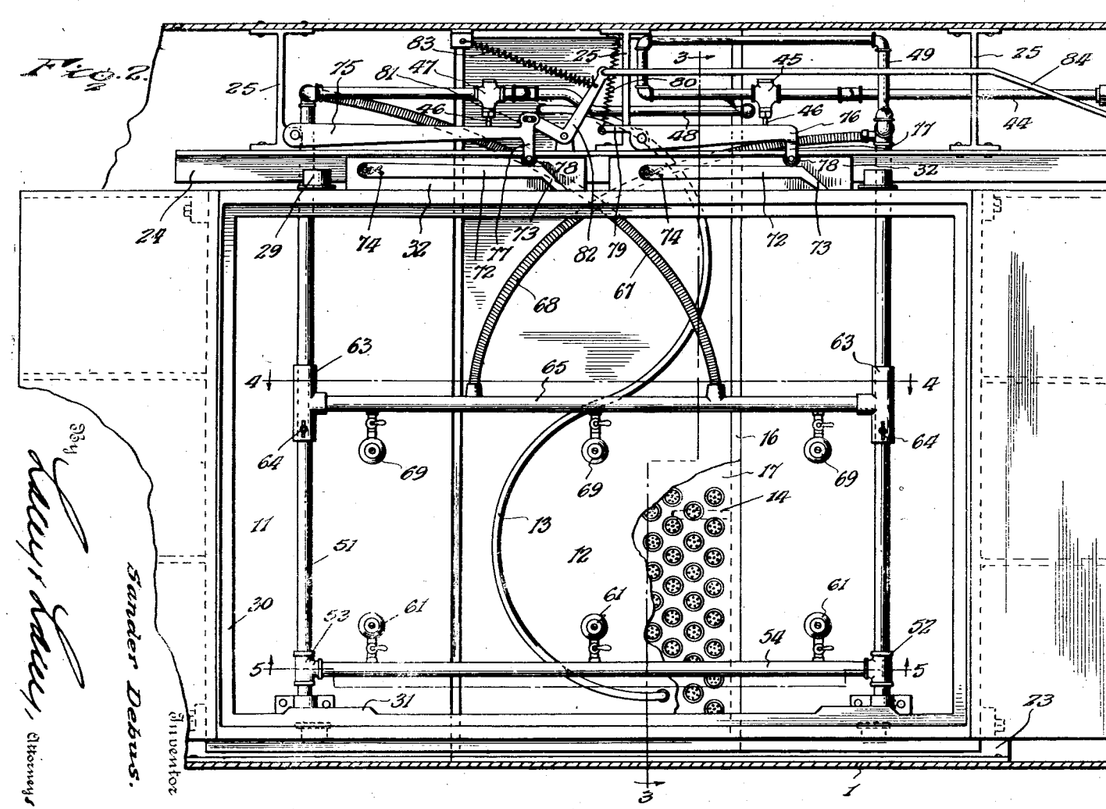
Fig. 2 is an enlarged plan view with the cover removed.

In the operation of the apparatus, the pans are placed upon the die plate 33, as shown in Fig. 1, so as to be supported in inverted position over the tank and over the spraying nozzles, and the operator pushes the carriage with the pans thereon alternately in opposite directions, the pans being sprayed during its working stroke and the spray being cut off during the back stroke. During the working stroke of the carriage, the damper 39 is closed but during the back stroke the damper is opened and it remains open until a second working stroke is started. In the position shown in Fig. 2 of the drawings, the working stroke of the carriage is in progress and the rollers 78 are bearing against the outer side edges of the respective cam levers. The oil and air cut-off valves are opened and will remain open until the working stroke is completed at which time the pivoted ends of the respective cams will be carried beyond the free ends of the levers 75 and 76 and the springs 80 and 83 will then at once swing the levers 75 and 76 so as to carry the rollers against the side of the carriage. On the ensuing back stroke of the carriage, the rollers will pass between the carriage and the cam levers 72 and at the end of the stroke will engage the obliquely disposed end portions 73 and swing the same outwardly, the springs 74 immediately returning the cam levers to contact with the carriage, whereupon the rollers assume positions adjacent and against the extremities of the cam levers. On the next working stroke of the carriage, the inclined sides of these terminals 73 will be engaged by the respective rollers and the latter and the levers 75 and 76 will be swung outwardly so that the valves 45 and 47 will be again opened. When the lever 75 is thus swung outwardly, the angle lever 82 will be rocked so that the connecting rod 84 will rock the damper crank 85 and close the damper and when the working stroke is completed and the several parts are rocked to close the valves 45 and 47 the angle lever 82 will be rocked in the reverse direction and the damper opened.

From the foregoing description, taken in connection with the accompanying drawings, it will be seen that I have provided a very compact apparatus whereby baking pans may be thoroughly and rapidly sprayed with grease and the operation will be entirely automatic except for the manual impulse imparted to the carriage and the pans to reciprocate them across the spray nozzles. The grease or oil to be sprayed is placed in the grease pot 12 to any desired level before the pans are placed in position and the screen cover 17 is then placed over the grease pot, the electric circuit through the heating element 13 being closed so that said element will function to melt the grease and maintain it in a thoroughly liquid condition. The grease pump and the air compressor will operate to maintain a constant supply of air and grease in the pipes leading directly to the spray nozzles and the parts will need no attention except possibly at long intervals of use.

Having thus described the invention, I claim:

1. In a pan-greasing machine, the combination of spraying elements, means for supplying grease and an atomizing agent to the spraying elements whereby the grease will be atomized at the elements, a pan carrier mounted for travel above the spraying elements, and means controlled by the carrier to admit grease and atomizing agent to the spraying elements during the working stroke of the carrier and cutting off the supply of grease and atomizing agent during the back stroke of the carrier.

2. In a pan-greasing machine, the combination of spraying nozzles, means for supplying grease and an atomizing agent to the nozzles whereby the grease will be atomized in the nozzles and discharged therefrom in a spray, a pan carrier mounted for reciprocation above the nozzles, cut-off valves controlling the flow of grease and atomizing agent respectively, and devices controlled by the reciprocation of the carrier to open said valves during the working stroke of the carrier and to close the valves during the back stroke of the carrier.

3. In a pan-greasing machine, the combination of spraying nozzles, means for supplying grease and an atomizing agent to said nozzles, cut-off valves interposed in said means for controlling the flow of the grease and atomizing agent respectively, a reciprocating pan carrier mounted above the nozzles, levers mounted at one side of the carrier and connected with said valves, and cams on the carrier acting upon said levers whereby the valves will be opened during the working stroke of the carrier and closed during the return stroke of the carrier.

4. In a pan-greasing machine, the combination of spraying nozzles, means for supplying grease and an atomizing agent to the nozzles, valves interposed in said means for controlling the flow, levers mounted adjacent the said valves and connected therewith, and pivoted cam elements mounted on the carrier and engaging said levers whereby the valves will be opened during the working stroke of the carrier and closed during the back stroke of the carrier.

5. In a pan-greasing machine, the combination of spraying nozzles, a pan carrier mounted for reciprocation above the nozzles, means for supplying grease and an atomizing agent to the nozzles, valves interposed in said means to control the flow, levers pivotally mounted between the valves and the carrier and connected with the valves to operate the same and having their free ends projecting toward the carrier, brackets on the carrier, and cam elements pivotally mounted on said brackets and yieldably held toward the carrier, the free ends of said cam elements being beveled and extending toward the carrier and said elements being engaged by the inwardly projecting ends of the levers whereby during the working stroke of the carrier the levers will be caused to ride on the free ends of the cam elements and along the sides of the same to open the valves and on the back stroke of the carrier will travel between the cam elements and the carrier to maintain the valves closed.

6. In a pan-greasing machine, the combination of a relatively stationary spraying nozzle, a movable spraying nozzle mounted for adjustment toward and from the stationary nozzle, means for supplying grease and an atomizing fluid under pressure to the nozzles, a pan carrier reciprocating above the nozzles, and means controlled by the carrier for admitting grease and atomizing fluid to the nozzles during the working stroke of the carrier and cutting off the grease and atomizing fluid to the nozzles during the back stroke of the carrier.

7. In a pan-greasing machine, the combination of a relatively stationary nozzle, a movable nozzle adjustable toward and from the stationary nozzle, rigid pipes supplying grease and an atomizing fluid to the stationary nozzle, flexible pipes connected with the rigid pipes and supplying grease and atomizing fluid to the movable nozzle, a pan carrier mounted to reciprocate above the nozzles, and means controlled by the carrier for permitting flow of grease and atomizing fluid during the working stroke of the carrier and preventing such flow during the back stroke of the carrier.

8. In a pan-greasing machine, the combination of a plurality of spraying nozzles, main supply pipes conveying grease and an atomizing fluid respectively, supplemental pipes connected directly with the spraying nozzles, one of said pipes being in communication at one end with the main grease supply pipe and closed at its opposite end by the main atomizing fluid supply pipe and the other of said supplemental pipes being in communication at one end with the main atomizing fluid supply pipe and closed at its opposite end at the main grease supply pipe.

9. In a pan-greasing machine, the combination of a grease supply pipe, a supply pipe for atomizing fluid, fittings on said pipes, the fitting on one pipe having an outlet in communication therewith and a depending socket closed to said pipe and the fitting on the other pipe being closed thereto at one side and having a depending elbow open thereto, a branch grease-conveying pipe secured at one end in the depending portion of the last-mentioned fitting and at its other end in the socket of the first-mentioned fitting, a branch pipe connected at one end in the closed side of the second-mentioned fitting and at its opposite end in the outlet of the first-mentioned fitting, and connections between the said branch pipes and the spray nozzles.

10. In a pan greasing machine, the combination of a tank for grease, an outlet at one end of said tank, a damper in said outlet, spraying nozzles mounted in the tank, a pan carrier supported for reciprocation in the tank above the spray nozzles, means for supplying grease and an atomizing fluid to the spray nozzles, and means controlled by the carrier for permitting flow of grease and atomizing fluid to the nozzles and closing the damper during the working stroke of the carrier and for opening the damper and cutting off the flow of grease and atomizing fluid during the back stroke of the carrier.

11. In a pan-greasing-machine, the combination of a tank for grease having an outlet at one end, a blower at said outlet for driving off fumes, a damper in said outlet, a pan carrier mounted for reciprocation in the tank, means for spraying pans on the carrier during the reciprocation of the carrier, and means controlled by the carrier for closing the damper during the working stroke of the same and opening the damper on the return stroke of the carrier.

12. In a pan-greasing machine, the combination of a tank for grease, a pan carrier mounted for reciprocation in the upper portion of the tank, an outlet in one wall of the tank, a blower at said outlet for driving off fumes, a grease trap connected with said blower, a damper in the outlet, and means controlled by the carrier for closing the damper during the working stroke of the carrier and opening the damper during the return stroke of the carrier.

13. In a pan-greasing machine, the combination of a tank, a grease pot in the bottom of the tank, spraying nozzles mounted in the tank above the grease pot, a heating element in the grease pot, a pan carrier mounted to reciprocate above the spraying nozzles, means for supplying an atomizing fluid to the spraying nozzles, means for forcing grease from the tank to the spraying nozzles, and means controlled by the pan carrier for permitting flow of grease and atomizing fluid during the working stroke of the carrier and cutting off such flow during the return stroke of the carrier.

14. In a pan-greasing machine, the combination of a tank, a grease pot in the bottom of the tank, a screening cover over the grease pot, a plurality of spraying nozzles mounted in the tank above the grease pot, a pan carrier mounted for reciprocation above the spraying nozzles, means for forcing grease from the grease pot to the spraying nozzles, means for supplying an atomizing fluid to the spraying nozzles, and means controlled by the carrier for permitting flow of grease and atomizing fluid to the nozzles during the working stroke of the carrier and cutting off such flow during the return stroke of the carrier.

15. In a pan-greasing machine, the combination of a casing, a cover for said casing having an opening therethrough to accommodate pans to be greased, a plurality of spraying nozzles mounted in the casing below the opening through the cover, means for supplying grease and an atomizing fluid to the spraying nozzles, a pan carrier mounted for reciprocation below the cover, and grease deflectors carried by the ends of the pan carrier and projecting therefrom under the cover at the sides of the opening therethrough.

16. In a pan-greasing machine, the combination of a tank, a grease pot depending from the bottom of the tank, ledges on the walls of the grease pot at the top of the same, a screened cover consisting of a perforated plate having its edges resting on said ledges, and a screen secured to the under side of said perforated plate, said plate and screen being formed in sections, a supporting strip secured to the under side of one section at the meeting edge thereof and underlying the meeting edge of the other section, spraying elements in the tank above the grease pot, a pan carrier mounted for reciprocation above the spraying elements, means for transferring grease from the grease pot to the spraying elements, and means for supplying an atomizing fluid to the spraying elements.

In testimony whereof I affix my signature.

SANDER DEBUS. [L. S.]